United States Patent
Linn et al.

(10) Patent No.: US 11,049,658 B2
(45) Date of Patent: Jun. 29, 2021

(54) STORAGE CAPACITOR FOR USE IN AN ANTENNA APERTURE

(71) Applicant: Kymeta Corporation, Redmond, WA (US)

(72) Inventors: Steven Linn, Hillsboro, OR (US); Cagdas Varel, Seattle, WA (US)

(73) Assignee: KYMETA CORPORATION, Redmond, WA (US)

(*) Notice: Subject to any disclaimer, the term of this patent is extended or adjusted under 35 U.S.C. 154(b) by 505 days.

(21) Appl. No.: 15/849,483

(22) Filed: Dec. 20, 2017

(65) Prior Publication Data
US 2018/0182556 A1 Jun. 28, 2018

Related U.S. Application Data

(60) Provisional application No. 62/438,279, filed on Dec. 22, 2016.

(51) Int. Cl.
*H01G 4/30* (2006.01)
*H01Q 1/44* (2006.01)
(Continued)

(52) U.S. Cl.
CPC ............ *H01G 4/30* (2013.01); *H01Q 1/44* (2013.01); *H01Q 1/48* (2013.01); *H01Q 9/0407* (2013.01);
(Continued)

(58) Field of Classification Search
CPC ............... H01Q 13/103; H01Q 21/064; H01G 4/30–308; H01G 4/33; H01G 4/35
See application file for complete search history.

(56) References Cited

U.S. PATENT DOCUMENTS 5,187,490 A * 2/1993 Ohta ............... H01Q 21/0081
343/700 MS
6,195,043 B1 * 2/2001 Azzarelli ............... G01S 3/06
342/362
(Continued)

FOREIGN PATENT DOCUMENTS

CN 104321929 1/2015
CN 104701314 6/2015
(Continued)

OTHER PUBLICATIONS

R.L. Haupt et al., Reconfigurable Antennas, IEEE Antennas and Propagation Magazine, vol. 55(1), p. 49-61, Feb. 2013 (Year: 2013).*
(Continued)

*Primary Examiner* — Bernarr E Gregory
*Assistant Examiner* — Fred H Mull
(74) *Attorney, Agent, or Firm* — Womble Bond Dickinson (US) LLP

(57) ABSTRACT

A storage capacitor and method for using the same in an antenna aperture are described. In one embodiment, an antenna comprises a physical antenna aperture having first and second substrates forming an array of radio-frequency (RF) radiating antenna elements that are controlled and operable together to form a beam for the frequency band for use in holographic beam steering, wherein each of the antenna elements is coupled to a circuit to supply a voltage to the said each antenna element and a storage capacitor formed with a plurality of conductive layers (e.g., metal layers) on a first substrate, wherein top and bottom conductive layers of the plurality of conductive layers are at a first voltage that is equal to a second voltage on a conductive layer (e.g., a metal layer) of the second substrate to reduce (Continued)

parasitic capacitance produced between the storage capacitor and the conductive layer on the second substrate.

23 Claims, 11 Drawing Sheets

(51) Int. Cl.
*H01Q 1/48* (2006.01)
*H01Q 9/04* (2006.01)
*H01Q 13/10* (2006.01)
*H01Q 21/06* (2006.01)
*H01G 4/35* (2006.01)

(52) U.S. Cl.
CPC ......... *H01Q 13/103* (2013.01); *H01Q 21/064* (2013.01); *H01G 4/35* (2013.01)

(56) References Cited

U.S. PATENT DOCUMENTS

| | | | |
|---|---|---|---|
| 9,130,278 B2* | 9/2015 | Palevsky | H01Q 9/0435 |
| 2003/0190556 A1* | 10/2003 | Nakashima | G03F 1/50 430/312 |
| 2007/0256917 A1* | 11/2007 | Oberhammer | H01H 59/0009 200/181 |
| 2009/0168294 A1* | 7/2009 | Park | H01G 4/30 361/301.4 |
| 2010/0207835 A1 | 8/2010 | Taura | |
| 2014/0004804 A1 | 1/2014 | Suh et al. | |
| 2015/0318618 A1* | 11/2015 | Chen | H01Q 21/005 343/750 |
| 2016/0035762 A1 | 2/2016 | Cleeves et al. | |
| 2016/0126199 A1 | 5/2016 | Roy et al. | |
| 2019/0221927 A1* | 7/2019 | Shinada | H01Q 3/44 |

FOREIGN PATENT DOCUMENTS

| | | | |
|---|---|---|---|
| CN | 105960735 | 9/2016 | |
| JP | 2005244043 A * | 9/2005 | ............... H01Q 3/28 |
| KR | 1020090070039 A | 7/2009 | |
| WO | 2015126550 | 8/2015 | |
| WO | WO-2015126550 A1 * | 8/2015 | ............... H01Q 3/28 |

OTHER PUBLICATIONS

English translation of JP 2005244043 A (Year: 2020).*
International Preliminary Report on Patentability for Application No. PCT/US2017/068030, dated Jul. 4, 2019, 10 pages.
PCT Application No. PCT/US2017/068030, Notification of Transmittal of the International Search Report and the Written Opinion, dated Apr. 16, 2018, 13 pgs.
Chinese Office Action for Application No. 201780087231.2 dated May 8, 2020, 8 pages.
Chinese Office Action on the Patentability of Application No. 201780087213.2, dated Dec. 3, 2020, 3 pages.
Chinese Office Action on the Patentability of Application No. 201780087231.2, dated Dec. 3, 2020, 3 pages.
Korean Office Action and Search Report on the Patentability of Application No. 10-2019-7020003, dated Dec. 19, 2020, 7 pages.

* cited by examiner

US 11,049,658 B2

STORAGE CAPACITOR FOR USE IN AN ANTENNA APERTURE

PRIORITY

The present patent application claims priority to and incorporates by reference the corresponding provisional patent application Ser. No. 62/438,279, titled, "A Method to Reduce the Storage Capacitor Size in TFT Apertures," filed on Dec. 22, 2016.

FIELD OF THE INVENTION

Embodiments of the present invention relate to the field of antennas for use in wireless communication systems; more particularly, embodiments of the present invention relate to storage capacitors used in antenna apertures that have a structure that reduces, and potentially eliminates, a parasitic capacitance.

BACKGROUND

In radio-frequency (RF) antenna apertures, the apertures include a number of RF antenna elements. The number of antenna elements could be in the thousands. To control the antenna elements, circuitry is needed and must be routed to each of the elements. However, the space between the RF antenna elements used to place circuitry and to route the electrical wiring for the antenna elements is limited. This circuitry can take up space between the antenna elements and make routing the electrical wiring difficult. Therefore, in the layout of RF apertures, it is desirable to make the circuitry occupy as little space as possible.

As the desired transmit and receive frequencies of an antenna aperture become higher, the space between the antenna elements will continue to decrease and the pitch of antenna elements will go down, whereas the wiring trace widths, the space between traces, the space between circuit elements, does not necessarily decrease proportionally. This leads to congestion in the spaces between the elements where the circuits reside and can create difficulty in routing.

SUMMARY OF THE INVENTION

A storage capacitor and method for using the same in an antenna aperture are described. In one embodiment, an antenna comprises a physical antenna aperture having first and second substrates forming an array of radio-frequency (RF) radiating antenna elements that are controlled and operable together to form a beam for the frequency band for use in holographic beam steering, wherein each of the antenna elements is coupled to a circuit to supply a voltage to the said each antenna element and a storage capacitor formed with a plurality of conductive layers (e.g., metal layers) on a first substrate, wherein top and bottom conductive layers of the three conductive layers are at a first voltage that is equal to a second voltage on a conductive layer (e.g., a metal layer) of the second substrate to reduce parasitic capacitance produced between the storage capacitor and the conductive layer on the second substrate.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

A storage capacitor for use in antenna aperture is described. In one embodiment, the antenna aperture is a radio-frequency (RF) antenna aperture with RF radiating antenna elements (e.g., surface scattering antenna elements). The antenna aperture includes drive and control circuit elements (e.g., thin-film transistors (TFTs) and storage capacitors between antenna elements. Thus, these elements are in the active area of the antenna aperture. Embodiments of the invention include techniques to reduce the size of the TFT/storage capacitor in the layout of the active substrate for an RF antenna aperture.

In one embodiment, the storage capacitor structure also partially or totally eliminates a large variable parasitic capacitance. The parasitic capacitance is formed by the top plate of the storage capacitor and the iris metal plane as the other plate, with liquid crystal in between.

Figure 1:
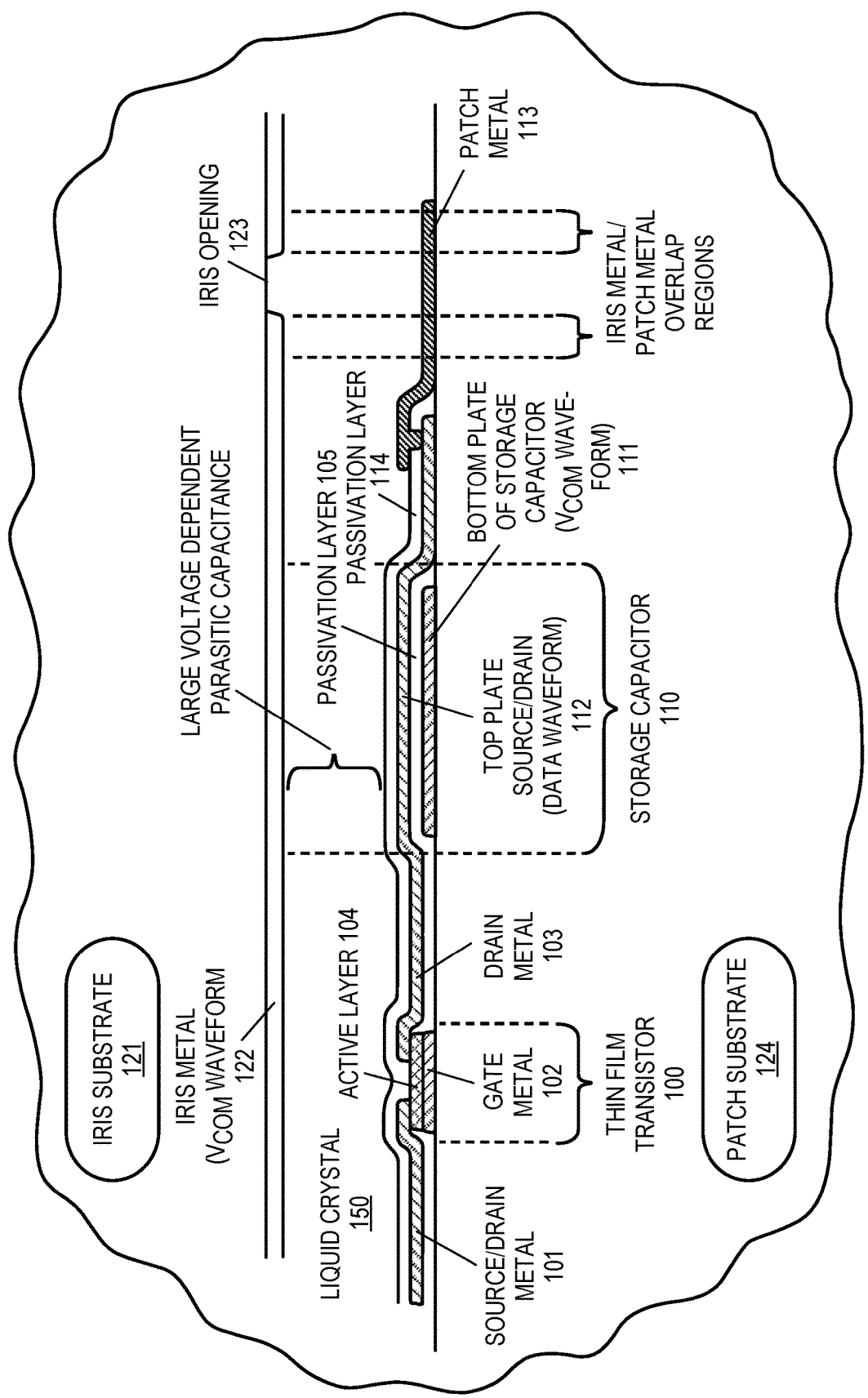
FIG. 1 illustrates one embodiment of a storage capacitor that is integrated into an antenna having patch and iris substrates.

FIG. 1 illustrates one embodiment of a storage capacitor that is part of an antenna aperture having radio-frequency (RF) radiating antenna elements, such as, for example, the antenna elements described in more detail below.

Referring to FIG. 1, an example of one of the thin film transistors (TFTs) used to control an antenna element is shown. The TFT has a bottom gate structure and is used to supply voltage to an RF antenna element. Alternatively, other gates structures are possible, e.g., top gate, as well as various TFTs such as IGZO a-Si and LTPS. In one embodiment, there is one TFT and storage capacitor per antenna element. Note that it isn't mandatory and parallel TFTs can be used to reduce series resistance.

More specifically, TFT 100 comprises a source metal layer 101, a drain metal layer 103 and a gate metal layer 102. Source metal layer 101 is used as the source electrode of TFT 100, gate metal layer 102 is used as the gate electrode of TFT 100, and drain metal layer 103 is used as the drain electrode of TFT 100. In one embodiment, gate metal layer 102 is on a patch substrate 124. In one embodiment, patch substrate 124 is a glass substrate. However, patch substrate 124 may be made of materials other than glass or a combination of materials. For example, organic substrates such as PET, PEN, or Polyimide films are typically used in flexible display applications may be used for patch substrate 124. An active layer 104, which is a gate dielectric layer, is on top of gate metal layer 102. In one embodiment, active layer 104 is a bi-layer structure having a layer of semiconductor material (e.g., Si (e.g., amorphous-Si, poly-Si or single-crystal. etc.), GaAS, etc.) and a layer of gate oxide. In alternative embodiments, active layer 104 is formed with other well-known semiconductor materials.

In one embodiment, both source metal layer 101 and drain metal layer 103 extend onto a portion of active layer 104 that is over gate metal layer 102. Thus, both source metal layer 101 and drain metal layer 103 partially overlap gate metal layer 102. In one embodiment, source metal layer 101 and drain metal layer 103 are created from the same metal layer fabricated onto active layer 104 with the portion of the metal layer over the central portion of active layer 104 that overlaps gate metal layer 102 being removed. This removal may be performed using well-known fabrication techniques, such as, for example, etching in a manner well-known in the art.

FIG. 1 also shows a portion of the gate metal layer, other than gate metal layer 102, forms bottom plate 111 of storage capacitor 110, while drain metal layer 103 forms the top of storage capacitor 110. That is, the bottom gate metal layer that is used for the gate (gate metal layer 102) of TFT 100 and is used for bottom plate 111 of storage capacitor 110, although it is not connected to gate metal layer 102 of TFT 100. A dielectric layer (e.g., passivation layer 105) of TFT 100 is also used as the dielectric (e.g., the dielectric layer between bottom plate 111 and top plate 112) for storage capacitor 110.

Patch metal layer 113 (patch electrode) is electrically connected to top plate 103. Note that in one embodiment, patch metal layer 113 is created from the same metal layer that created the patch metal layer for the patch/iris antenna element pairs, such as, for example, described in more detail below. Alternatively, patch metal layer 113 is deposited independently of the patch metal layers used for the patch/iris antenna element pairs. A passivation layer 114 is over both TFT 100 and storage capacitor 110.

Iris substrate 121 is above patch substrate 124. In one embodiment, iris substrate 121 is a glass substrate. However, iris substrate 121 may be made of materials other than glass or a combination of materials. Iris metal layer 122 is formed on iris substrate 121. In one embodiment, a passivation layer (not shown) is deposited over iris metal layer 122.

Liquid crystal (LC) 150 is in the gap between iris substrate 121 and patch substrate 124. Also, in one embodiment, the gap also includes spacers (e.g., photo spacers) to maintain the gap size.

Iris metal layer 122 includes iris opening 123 that overlaps a portion of patch metal layer 113, such that portions of the iris metal layer 122 on both sides of iris opening 123 overlap portions of patch metal layer 113, thereby forming iris metal/patch metal overlap regions. These overlap regions form the two electrodes of the LC capacitance and define the size of the LC capacitance, which is tuned to control the frequency of the antenna.

Iris metal 122 and bottom plate 111 of storage capacitor 110 are operated at the same voltage. Bottom plate 111 of storage capacitor 110 is electrically connected to a reference potential, namely a common voltage ($V_{com}$). Iris metal 122 is also electrically connected to $V_{com}$. In one embodiment, $V_{com}$ is the voltage used on the iris to drive the LC between the patch and iris of the antenna elements (e.g., surface scattering antenna elements that radiate RF energy as described, for example, in more detail below). Because both iris metal 122 and bottom plate 111 are at the same potential, a large voltage dependent parasitic capacitance is formed by top plate 112 (source/drain metal layer) of storage capacitor 110 and iris metal layer 122 as the other plate, with LC 150 therebetween. Since the dielectric in this gap is an LC with a very large dielectric anisotropy, the LC moves as the voltage is increased, thereby producing a very non-linear capacitance with voltage.

Embodiments of the storage capacitor described herein take advantage of a third metal layer (e.g., a patch electrode) that is made from the same metal layer fabricated (e.g., deposited) for making the patch for the RF antenna element. In one embodiment, a patch metal layer is deposited on the top of the storage capacitor structure set forth in FIG. 1. In one embodiment, this extra patch metal is connected to the gate metal bottom plate of the storage capacitor using a via structure. In one embodiment, this via is created so that a connection between the top plate patch metal and the bottom plate gate metal of the storage capacitor is made where no portions of source/drain metal is present. This ties the potential of patch metal top plate of the storage capacitor to the potential of the gate metal bottom plate. The drain metal layer (created from the same metal layer from which the source metal layer is created) is the middle plate in the storage capacitor. The third layer adds capacitance to the storage capacitor structure. In one embodiment, the third layer is Indium-Tin-Oxide (ITO).

Figure 2:
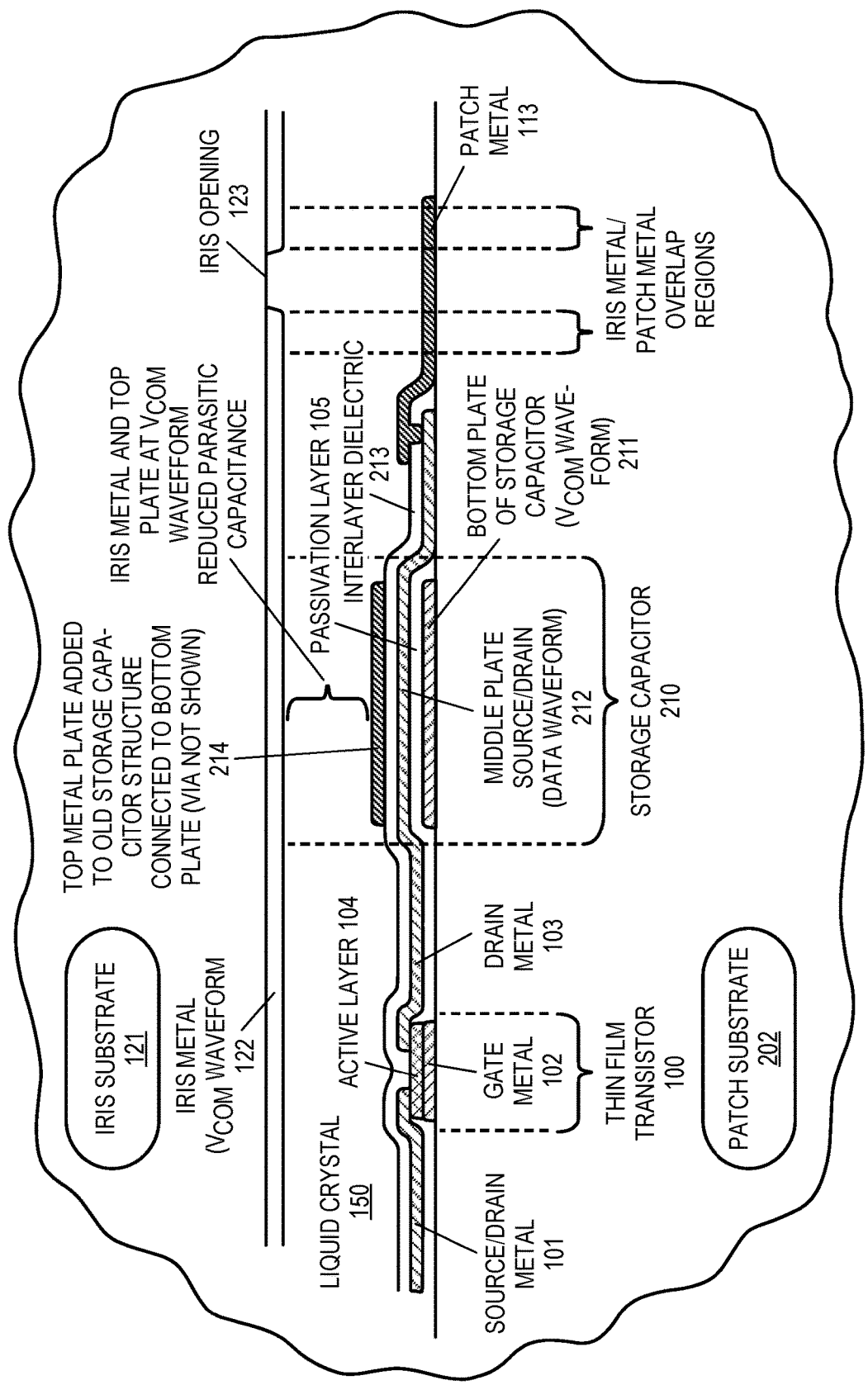
FIG. 2 illustrates another embodiment of a storage capacitor that is integrated into an antenna having patch and iris substrates.

FIG. 2 illustrates an embodiment of a storage capacitor. Referring to FIG. 2, iris substrate 121 and TFT 100 are the same as in FIG. 1, while patch substrate 202 is the same except where the differences have been highlighted.

In FIG. 2, storage capacitor 210 includes bottom plate 211 that is formed from another portion of the layer from which the gate metal layer of TFT 100 is formed, while drain metal layer 103 forms the middle plate 212 of storage capacitor 110. That is, different portions of the bottom gate metal layer are used for the gate (gate metal layer 102) of TFT 100 and for bottom plate 211 of storage capacitor 210, although bottom plate 211 of storage capacitor 210 is not connected to gate metal layer 102 of TFT 100. The passivation dielectric layer (e.g., passivation 105) of TFT 100 is also used as a dielectric (e.g., the dielectric layer between bottom plate 211 and middle plate 212) for storage capacitor 210.

On top of middle plate 212 is an interlayer dielectric 213. In one embodiment, interlayer dielectric 213 also serves as a passivation layer over TFT 100. Storage capacitor 210 also includes a top metal plate 214. In one embodiment, top metal plate 214 is electrically connected to bottom plate 211. In one embodiment, top metal plate 214 is electrically connected to bottom plate 211 using a via (not shown).

Top metal plate 214 of storage capacitor 210 is electrically connected to bottom plate 211. Note that in one embodiment, top metal plate 214 is created from the same metal layer that created the patch metal layer for the patch/iris antenna element pairs, such as, for example, described in more detail below. Alternatively, top metal plate 214 is deposited independently of the patch metal layers used for the patch/iris antenna element pairs.

Thus, in summary, while the storage capacitor in FIG. 1 includes a top plate connected to the patch electrode and a bottom plate connected to $V_{com}$, the storage capacitor of FIG. 2 includes a top plate that is connected to a bottom plate, a middle plate that is connected to a patch electrode, and the bottom plate that is connected to $V_{com}$. Also, in the storage capacitor of FIG. 2, the top plate can be made from the patch metal layer, but it cannot be connected to the patch electrode.

Note that while one embodiment of the storage capacitor has three metal layers, the one or more of these layers may be implemented with other conductive materials. For example, in one embodiment, the storage capacitor is implemented with three conductive layers. The three conductive layers are non-metal layers and may comprise ITO or other conductive films.

Although not shown in FIG. 2, a passivation layer is over both TFT 100 and storage capacitor 210. Above the passivation layer is a gap with the photo spacers (not shown) and LC 150.

In one embodiment, bottom plate 211 and top plate 214 are at the same common voltage potential, $V_{com}$. This is the same potential as is iris metal layer 122. Middle plate 212, however, is at a different voltage, referred to in FIG. 2 as a data waveform, or source signal, which in one embodiment is the voltage signal coming from a data driver on the columns of an active matrix array to apply a voltage onto the LC of the antenna element.

Because storage capacitor 210 is a combination of storage capacitor 110 with an additional dielectric layer (213) and metal layer (214) on top, the capacitance of storage capacitor 210 is made up of two capacitances, the first being a capacitance from top metal plate 214 to drain metal layer 103 and the second being from drain metal layer 103 to bottom plate 211. Thus, the storage capacitor operates as a double capacitor. In one embodiment, this allows the footprint of storage capacitor 210 to be about one half the footprint of storage capacitor 110.

Note also the structure of storage capacitor 210 provides additional benefits. First, because top metal plate 214 is electrically connected to bottom plate 211, then its voltage is the same, which is $V_{com}$. Thus, there is no voltage difference between the top part of storage capacitor 210 and iris metal layer 122. Therefore, since both top metal plate 214 of storage capacitor 210 and iris metal layer 122 are electrically connected to the common voltage $V_{com}$, the parasitic capacitance between top metal plate 214 of storage capacitor 210 and iris metal layer 122 is reduced, and potentially eliminated. Additionally, because the total capacitance is decreased, which includes the parasitic capacitance, the storage capacitance value, and the area needed to accommodate the storage capacitor, can be further decreased while keeping the ratio of storage capacitance to the total capacitance constant.

There are a number of alternative embodiments. For example, in one alternative embodiment, the layer stack of storage capacitor 210 can be extended by adding a layer of dielectric, a metal layer electrically connected to a drain metal layer (e.g., middle plate 212), a layer of dielectric and a metal layer electrically connected to bottom metal plate 211 to decrease the capacitor area further.

Only one TFT and one storage capacitor are shown in FIGS. 1 and 2 to illustrate embodiments of the present invention. However, in most embodiments, there are actually multiple such transistors and storage capacitors formed on one or more substrates (e.g., the patch substrate, the iris substrate, etc.). In one embodiment, there is one TFT and one storage capacitor for each antenna element. In another embodiment, one TFT and one storage capacitor can be used for controlling multiple antenna elements.

In one embodiment, the source and drain metal layers and the iris metal layer comprise copper. Alternatively, these layers could comprise other conductive materials, including other conductive metals, such as, for example, aluminum. In one embodiment, the gate layer of the TFT as well as the bottom layer of the storage capacitor comprise aluminum. Alternatively, the gate layer of the TFT and the bottom layer of the storage capacitor comprise other conductive materials, including other conductive metals, such as, for example, copper.

Furthermore, the layers described above with respect to FIGS. 1 and 2 are created using well-known fabrication techniques, including deposition and etching.

Drive Transistor, Storage Capacitor, and Antenna Element Placement

In one embodiment, the TFT (or other drive transistors), the storage capacitors (e.g., such as shown, for example, in FIG. 2), and the antenna elements (e.g., RF radiating antenna elements (e.g., surface scattering antenna elements)) are located in the active area of an antenna aperture (e.g., a cylindrically fed antenna aperture) in a way that allows for use of a systematic matrix drive circuit. The placement of the cells includes placement of the transistors (e.g., TFTs or other transistors) for the matrix drive to drive the antenna elements.

Figure 3:
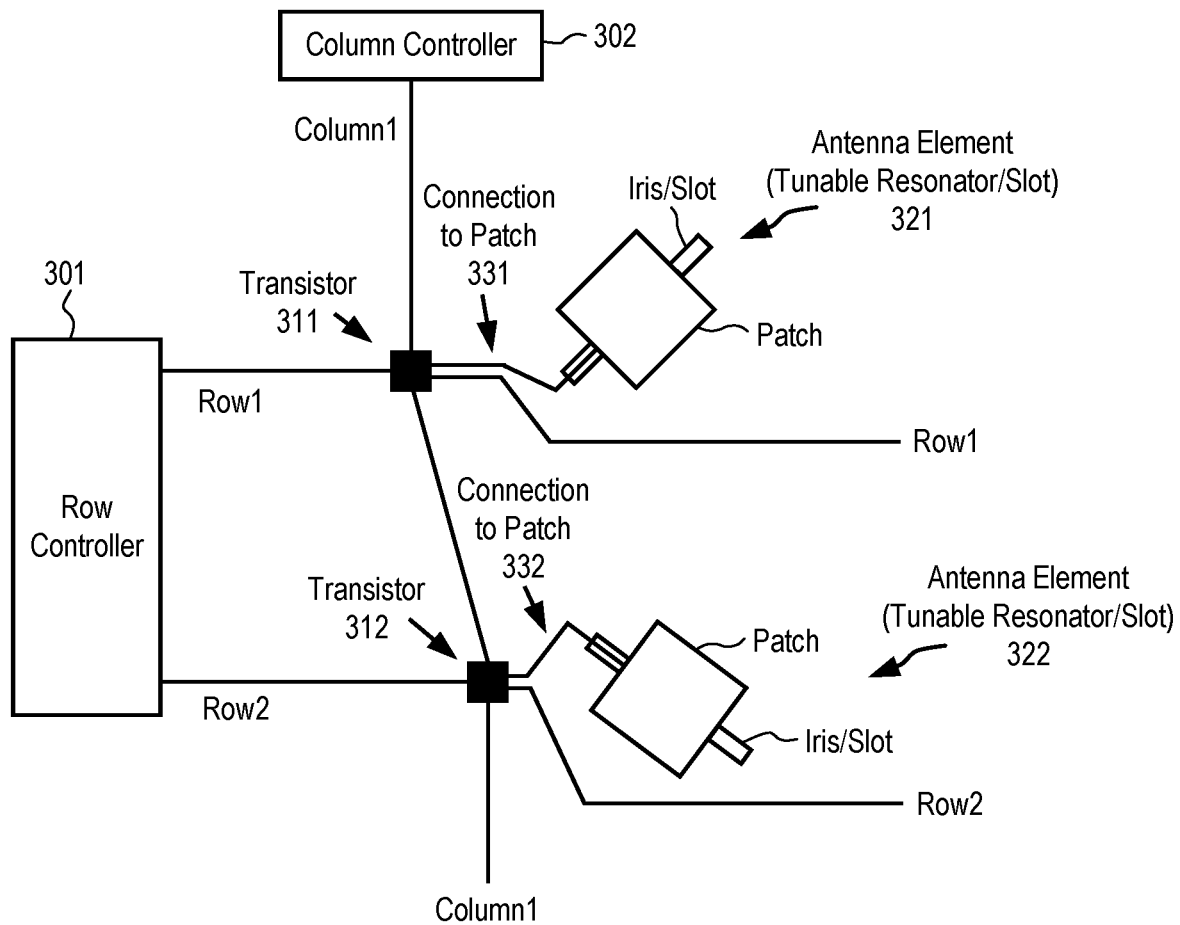
FIG. 3 illustrates one embodiment of the placement of matrix drive circuitry with respect to antenna elements.

FIG. 3 illustrates one embodiment of the placement of matrix drive circuitry with respect to antenna elements. Referring to FIG. 3, row controller 301 is coupled to transistors 311 and 312, via row select signals Row1 and Row2, respectively, and column controller 302 is coupled to transistors 311 and 312 via column select signal Column1. Transistor 311 is also coupled to antenna element 321 via connection to patch 331, while transistor 312 is coupled to antenna element 322 via connection to patch 332.

In an initial approach to realize matrix drive circuitry on the cylindrical feed antenna with unit cells placed in a non-regular grid, two steps are performed. In the first step, the cells are placed on concentric rings and each of the cells is connected to a transistor (e.g., a TFT) that is placed beside the cell and acts as a switch to drive each cell separately. In the second step, the matrix drive circuitry is built in order to connect every transistor (e.g., a TFT) with a unique address as the matrix drive approach requires. Because the matrix drive circuit is built by row and column traces (similar to LCDs) but the cells are placed on rings, there is no systematic way to assign a unique address to each transistor (e.g., a TFT). This mapping problem results in very complex circuitry to cover all the transistors and leads to a significant increase in the number of physical traces to accomplish the routing. Because of the high density of cells, those traces disturb the RF performance of the antenna due to coupling effect. Also, due to the complexity of traces and high packing density, the routing of the traces cannot be accomplished by commercially available layout tools.

In one embodiment, the matrix drive circuitry is predefined before the cells and transistors are placed. This ensures a minimum number of traces that are necessary to drive all the cells, each with a unique address. This strategy reduces the complexity of the drive circuitry and simplifies the routing, which subsequently improves the RF performance of the antenna.

More specifically, in one approach, in the first step, the cells are placed on a regular rectangular grid composed of rows and columns that describe the unique address of each cell. In the second step, the cells are grouped and transformed to concentric circles while maintaining their address and connection to the rows and columns as defined in the first step. A goal of this transformation is not only to put the cells on rings but also to keep the distance between cells and the distance between rings constant over the entire aperture. In order to accomplish this goal, there are several ways to group the cells.

Figure 4:
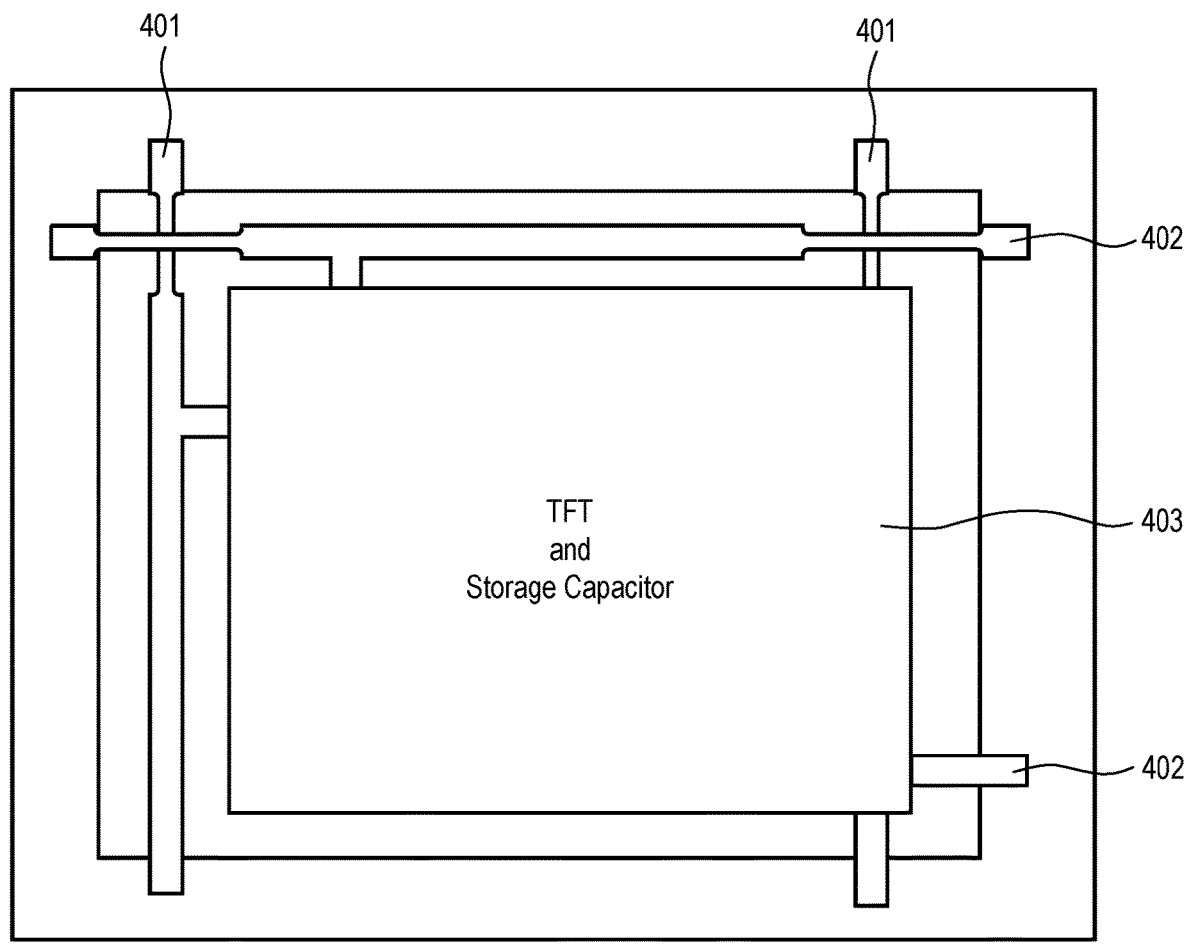
FIG. 4 illustrates one embodiment of a TFT package.

In one embodiment, a TFT package is used to enable placement and unique addressing in the matrix drive. FIG. 4 illustrates one embodiment of a TFT package. Referring to FIG. 4, a TFT and a storage capacitor 403 is shown with input and output ports. There are two input ports connected to traces 401 and two output ports connected to traces 402 to connect the TFTs together using the rows and columns. In one embodiment, the row and column traces cross in 90° angles to reduce, and potentially minimize, the coupling between the row and column traces. In one embodiment, the row and column traces are on different layers.

Examples of Antenna Embodiments

The techniques described above may be used with flat panel antennas. Embodiments of such flat panel antennas are disclosed. The flat panel antennas include one or more arrays of antenna elements on an antenna aperture. In one embodiment, the antenna elements comprise liquid crystal cells. In one embodiment, the flat panel antenna is a cylindrically fed antenna that includes matrix drive circuitry to uniquely address and drive each of the antenna elements that are not placed in rows and columns. In one embodiment, the elements are placed in rings.

In one embodiment, the antenna aperture having the one or more arrays of antenna elements is comprised of multiple segments coupled together. When coupled together, the combination of the segments form closed concentric rings of antenna elements. In one embodiment, the concentric rings are concentric with respect to the antenna feed.

Examples of Antenna Systems

In one embodiment, the flat panel antenna is part of a metamaterial antenna system. Embodiments of a metamaterial antenna system for communications satellite earth stations are described. In one embodiment, the antenna system is a component or subsystem of a satellite earth station (ES) operating on a mobile platform (e.g., aeronautical, maritime, land, etc.) that operates using either Ka-band frequencies or Ku-band frequencies for civil commercial satellite communications. Note that embodiments of the antenna system also can be used in earth stations that are not on mobile platforms (e.g., fixed or transportable earth stations).

In one embodiment, the antenna system uses surface scattering metamaterial technology to form and steer transmit and receive beams through separate antennas. In one embodiment, the antenna systems are analog systems, in contrast to antenna systems that employ digital signal processing to electrically form and steer beams (such as phased array antennas).

In one embodiment, the antenna system is comprised of three functional subsystems: (1) a wave guiding structure consisting of a cylindrical wave feed architecture; (2) an array of wave scattering metamaterial unit cells that are part of antenna elements; and (3) a control structure to command formation of an adjustable radiation field (beam) from the metamaterial scattering elements using holographic principles.

Antenna Elements

Figure 5:
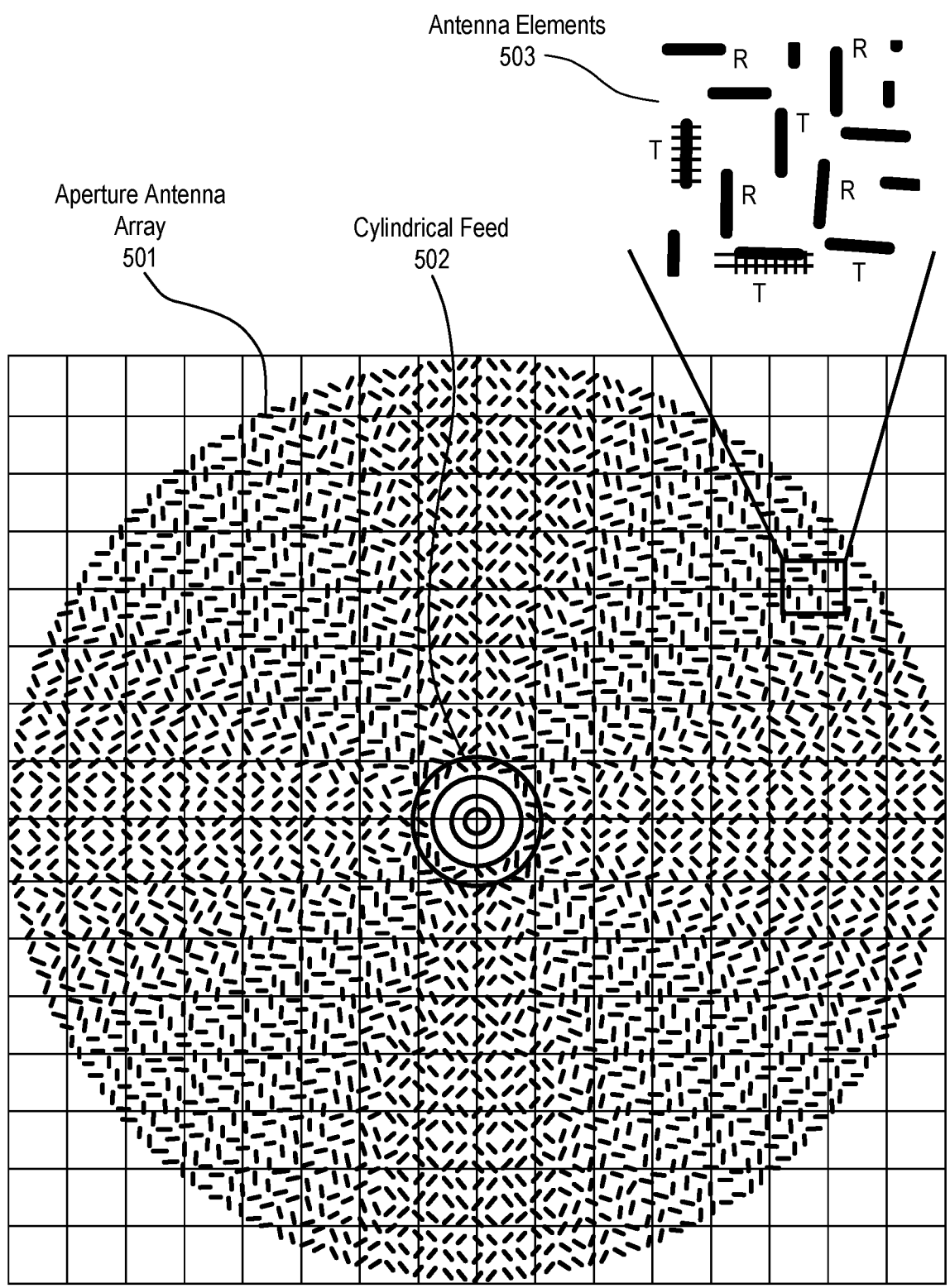
FIG. 5 illustrates the schematic of one embodiment of a cylindrically fed holographic radial aperture antenna.

FIG. 5 illustrates the schematic of one embodiment of a cylindrically fed holographic radial aperture antenna. Referring to FIG. 5, the antenna aperture has one or more arrays 501 of antenna elements 503 that are placed in concentric rings around an input feed 502 of the cylindrically fed antenna. In one embodiment, antenna elements 503 are radio frequency (RF) resonators that radiate RF energy. In one embodiment, antenna elements 503 comprise both Rx and Tx irises that are interleaved and distributed on the whole surface of the antenna aperture. Examples of such antenna elements are described in greater detail below. Note that the RF resonators described herein may be used in antennas that do not include a cylindrical feed.

In one embodiment, the antenna includes a coaxial feed that is used to provide a cylindrical wave feed via input feed 502. In one embodiment, the cylindrical wave feed architecture feeds the antenna from a central point with an excitation that spreads outward in a cylindrical manner from the feed point. That is, a cylindrically fed antenna creates an outward travelling concentric feed wave. Even so, the shape of the cylindrical feed antenna around the cylindrical feed can be circular, square or any shape. In another embodiment, a cylindrically fed antenna creates an inward travelling feed wave. In such a case, the feed wave most naturally comes from a circular structure.

In one embodiment, antenna elements 503 comprise irises and the aperture antenna of FIG. 5 is used to generate a main beam shaped by using excitation from a cylindrical feed wave for radiating irises through tunable liquid crystal (LC) material. In one embodiment, the antenna can be excited to radiate a horizontally or vertically polarized electric field at desired scan angles.

In one embodiment, the antenna elements comprise a group of patch antennas. This group of patch antennas comprises an array of scattering metamaterial elements. In one embodiment, each scattering element in the antenna system is part of a unit cell that consists of a lower conductor, a dielectric substrate and an upper conductor that embeds a complementary electric inductive-capacitive resonator ("complementary electric LC" or "CELC") that is etched in or deposited onto the upper conductor. As would be understood by those skilled in the art, LC in the context of CELC refers to inductance-capacitance, as opposed to liquid crystal.

In one embodiment, a liquid crystal (LC) is disposed in the gap around the scattering element. This LC is driven by the direct drive embodiments described above. In one embodiment, liquid crystal is encapsulated in each unit cell and separates the lower conductor associated with a slot from an upper conductor associated with its patch. Liquid crystal has a permittivity that is a function of the orientation of the molecules comprising the liquid crystal, and the orientation of the molecules (and thus the permittivity) can be controlled by adjusting the bias voltage across the liquid crystal. Using this property, in one embodiment, the liquid crystal integrates an on/off switch for the transmission of energy from the guided wave to the CELC. When switched on, the CELC emits an electromagnetic wave like an electrically small dipole antenna. Note that the teachings herein are not limited to having a liquid crystal that operates in a binary fashion with respect to energy transmission.

In one embodiment, the feed geometry of this antenna system allows the antenna elements to be positioned at forty-five degree (45°) angles to the vector of the wave in the wave feed. Note that other positions may be used (e.g., at 40° angles). This position of the elements enables control of the free space wave received by or transmitted/radiated from the elements. In one embodiment, the antenna elements are arranged with an inter-element spacing that is less than a free-space wavelength of the operating frequency of the antenna. For example, if there are four scattering elements per wavelength, the elements in the 30 GHz transmit antenna will be approximately 2.5 mm (i.e., ¼th the 10 mm free-space wavelength of 30 GHz).

In one embodiment, the two sets of elements are perpendicular to each other and simultaneously have equal amplitude excitation if controlled to the same tuning state. Rotating them +/−45 degrees relative to the feed wave excitation achieves both desired features at once. Rotating one set 0 degrees and the other 90 degrees would achieve the perpendicular goal, but not the equal amplitude excitation goal. Note that 0 and 90 degrees may be used to achieve isolation when feeding the array of antenna elements in a single structure from two sides.

The amount of radiated power from each unit cell is controlled by applying a voltage to the patch (potential across the LC channel) using a controller. Traces to each patch are used to provide the voltage to the patch antenna. The voltage is used to tune or detune the capacitance and thus the resonance frequency of individual elements to effectuate beam forming. The voltage required is dependent on the liquid crystal mixture being used. The voltage tuning characteristic of liquid crystal mixtures is mainly described by a threshold voltage at which the liquid crystal starts to be affected by the voltage and the saturation voltage, above which an increase of the voltage does not cause major tuning in liquid crystal. These two characteristic parameters can change for different liquid crystal mixtures.

In one embodiment, as discussed above, a matrix drive is used to apply voltage to the patches in order to drive each cell separately from all the other cells without having a separate connection for each cell (direct drive). Because of the high density of elements, the matrix drive is an efficient way to address each cell individually.

In one embodiment, the control structure for the antenna system has 2 main components: the antenna array controller, which includes drive electronics, for the antenna system, is below the wave scattering structure, while the matrix drive switching array is interspersed throughout the radiating RF array in such a way as to not interfere with the radiation. In one embodiment, the drive electronics for the antenna system comprise commercial off-the-shelf LCD controls used in commercial television appliances that adjust the bias voltage for each scattering element by adjusting the amplitude or duty cycle of an AC bias signal to that element.

In one embodiment, the antenna array controller also contains a microprocessor executing the software. The control structure may also incorporate sensors (e.g., a GPS receiver, a three-axis compass, a 3-axis accelerometer, 3-axis gyro, 3-axis magnetometer, etc.) to provide location and orientation information to the processor. The location and orientation information may be provided to the processor by other systems in the earth station and/or may not be part of the antenna system.

More specifically, the antenna array controller controls which elements are turned off and those elements turned on and at which phase and amplitude level at the frequency of operation. The elements are selectively detuned for frequency operation by voltage application.

For transmission, a controller supplies an array of voltage signals to the RF patches to create a modulation, or control pattern. The control pattern causes the elements to be turned to different states. In one embodiment, multistate control is used in which various elements are turned on and off to varying levels, further approximating a sinusoidal control pattern, as opposed to a square wave (i.e., a sinusoid gray shade modulation pattern). In one embodiment, some elements radiate more strongly than others, rather than some elements radiate and some do not. Variable radiation is achieved by applying specific voltage levels, which adjusts the liquid crystal permittivity to varying amounts, thereby detuning elements variably and causing some elements to radiate more than others.

The generation of a focused beam by the metamaterial array of elements can be explained by the phenomenon of constructive and destructive interference. Individual electromagnetic waves sum up (constructive interference) if they have the same phase when they meet in free space and waves cancel each other (destructive interference) if they are in opposite phase when they meet in free space. If the slots in a slotted antenna are positioned so that each successive slot is positioned at a different distance from the excitation point of the guided wave, the scattered wave from that element will have a different phase than the scattered wave of the previous slot. If the slots are spaced one quarter of a guided wavelength apart, each slot will scatter a wave with a one fourth phase delay from the previous slot.

Using the array, the number of patterns of constructive and destructive interference that can be produced can be increased so that beams can be pointed theoretically in any direction plus or minus ninety degrees (90°) from the bore sight of the antenna array, using the principles of holography. Thus, by controlling which metamaterial unit cells are turned on or off (i.e., by changing the pattern of which cells are turned on and which cells are turned off), a different pattern of constructive and destructive interference can be produced, and the antenna can change the direction of the main beam. The time required to turn the unit cells on and off dictates the speed at which the beam can be switched from one location to another location.

In one embodiment, the antenna system produces one steerable beam for the uplink antenna and one steerable beam for the downlink antenna. In one embodiment, the antenna system uses metamaterial technology to receive beams and to decode signals from the satellite and to form transmit beams that are directed toward the satellite. In one embodiment, the antenna systems are analog systems, in contrast to antenna systems that employ digital signal processing to electrically form and steer beams (such as phased array antennas). In one embodiment, the antenna system is considered a "surface" antenna that is planar and relatively low profile, especially when compared to conventional satellite dish receivers.

Figure 6:
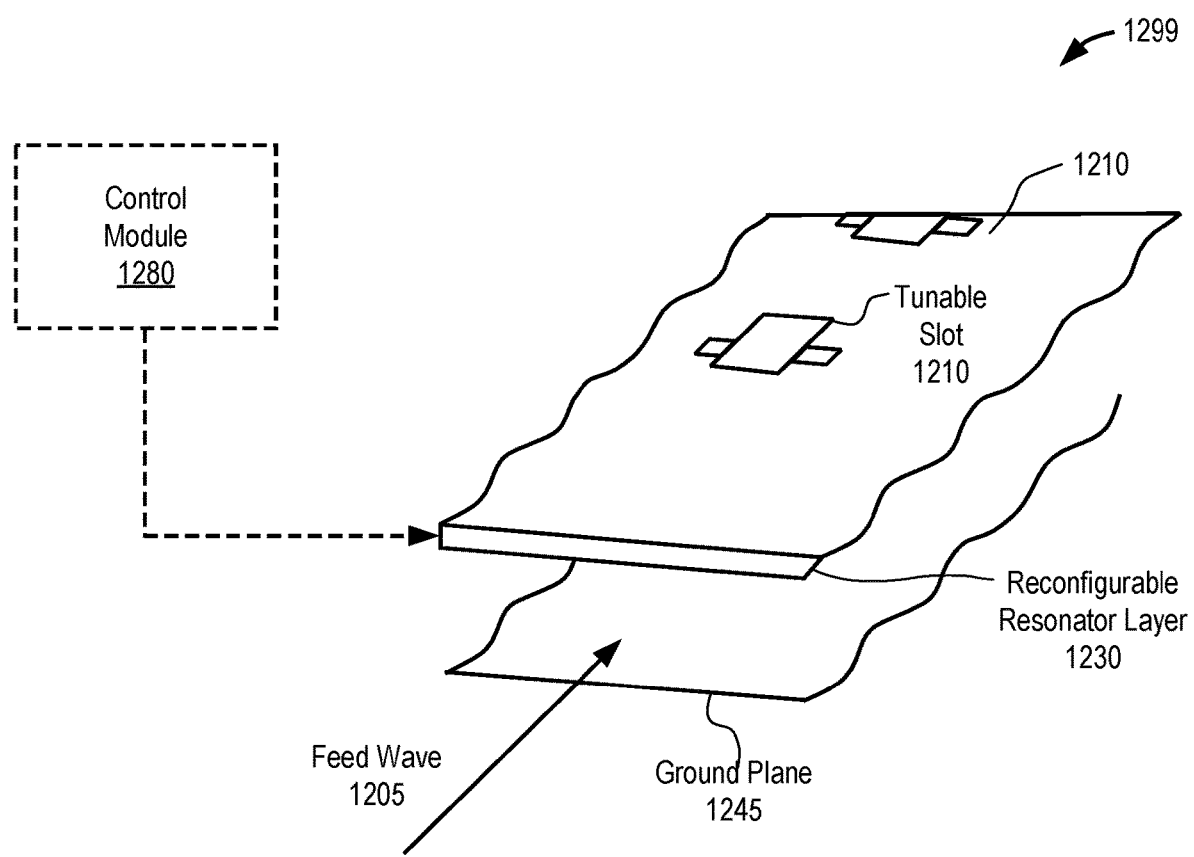
FIG. 6 illustrates a perspective view of one row of antenna elements that includes a ground plane and a reconfigurable resonator layer.

FIG. 6 illustrates a perspective view of one row of antenna elements that includes a ground plane and a reconfigurable resonator layer. Reconfigurable resonator layer 1230 includes an array of tunable slots 1210. The array of tunable slots 1210 can be configured to point the antenna in a desired direction. Each of the tunable slots can be tuned/adjusted by varying a voltage across the liquid crystal.

Figure 7:
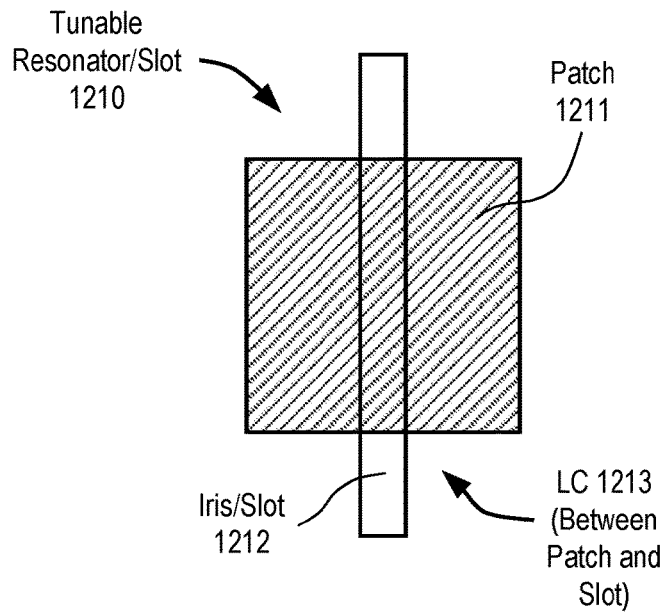
FIG. 7 illustrates one embodiment of a tunable resonator/slot.

Control module 1280 is coupled to reconfigurable resonator layer 1230 to modulate the array of tunable slots 1210 by varying the voltage across the liquid crystal in FIG. 7. Control module 1280 may include a Field Programmable Gate Array ("FPGA"), a microprocessor, a controller, System-on-a-Chip (SoC), or other processing logic. In one embodiment, control module 1280 includes logic circuitry (e.g., multiplexer) to drive the array of tunable slots 1210. In one embodiment, control module 1280 receives data that includes specifications for a holographic diffraction pattern to be driven onto the array of tunable slots 1210. The holographic diffraction patterns may be generated in response to a spatial relationship between the antenna and a satellite so that the holographic diffraction pattern steers the downlink beams (and uplink beam if the antenna system performs transmit) in the appropriate direction for communication. Although not drawn in each figure, a control module similar to control module 1280 may drive each array of tunable slots described in the figures of the disclosure.

Radio Frequency ("RF") holography is also possible using analogous techniques where a desired RF beam can be generated when an RF reference beam encounters an RF holographic diffraction pattern. In the case of satellite communications, the reference beam is in the form of a feed wave, such as feed wave 1205 (approximately 20 GHz in some embodiments). To transform a feed wave into a radiated beam (either for transmitting or receiving purposes), an interference pattern is calculated between the desired RF beam (the object beam) and the feed wave (the reference beam). The interference pattern is driven onto the array of tunable slots 1210 as a diffraction pattern so that the feed wave is "steered" into the desired RF beam (having the desired shape and direction). In other words, the feed wave encountering the holographic diffraction pattern "reconstructs" the object beam, which is formed according to design requirements of the communication system. The holographic diffraction pattern contains the excitation of each element and is calculated by $w_{hologram}=w_{in}*w_{out}$, with $w_{in}$ as the wave equation in the waveguide and $w_{out}$ the wave equation on the outgoing wave.

FIG. 7 illustrates one embodiment of a tunable resonator/slot 1210. Tunable slot 1210 includes an iris/slot 1212, a radiating patch 1211, and liquid crystal 1213 disposed between iris 1212 and patch 1211. In one embodiment, radiating patch 1211 is co-located with iris 1212.

Figure 8:
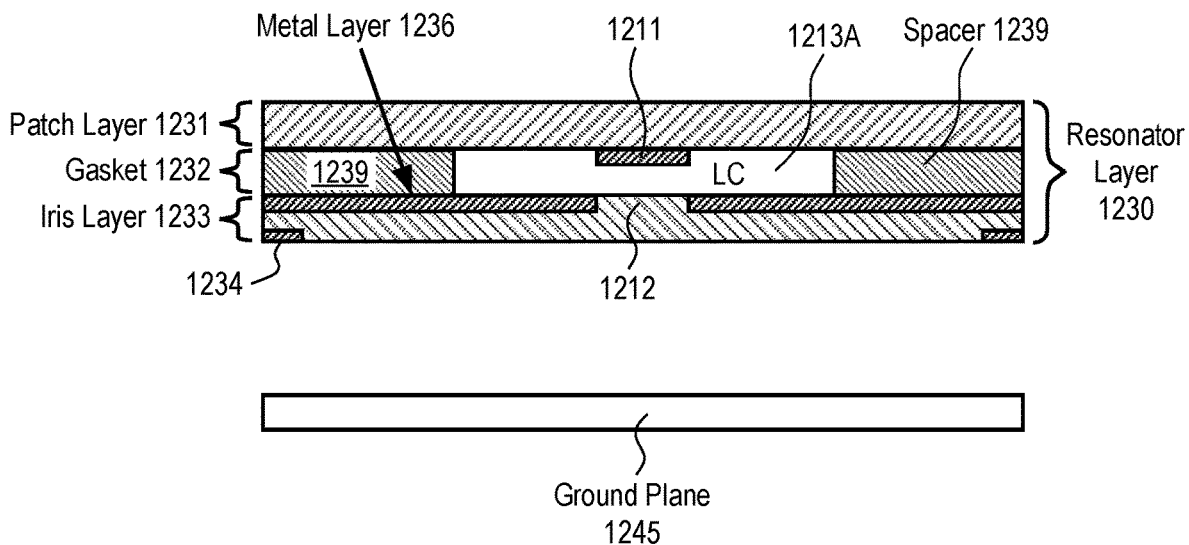
FIG. 8 illustrates a cross section view of one embodiment of a physical antenna aperture.

FIG. 8 illustrates a cross section view of one embodiment of a physical antenna aperture. The antenna aperture includes ground plane 1245, and a metal layer 1236 within iris layer 1233, which is included in reconfigurable resonator layer 1230. In one embodiment, the antenna aperture of FIG. 8 includes a plurality of tunable resonator/slots 1210 of FIG. 7. Iris/slot 1212 is defined by openings in metal layer 1236. A feed wave, such as feed wave 1205 of FIG. 7, may have a microwave frequency compatible with satellite communication channels. The feed wave propagates between ground plane 1245 and resonator layer 1230.

Reconfigurable resonator layer 1230 also includes gasket layer 1232 and patch layer 1231. Gasket layer 1232 is disposed between patch layer 1231 and iris layer 1233. Note that in one embodiment, a spacer could replace gasket layer 1232. In one embodiment, iris layer 1233 is a printed circuit board ("PCB") that includes a copper layer as metal layer 1236. In one embodiment, iris layer 1233 is glass. Iris layer 1233 may be other types of substrates.

Openings may be etched in the copper layer to form slots 1212. In one embodiment, iris layer 1233 is conductively coupled by a conductive bonding layer to another structure (e.g., a waveguide) in FIG. 8. Note that in an embodiment the iris layer is not conductively coupled by a conductive bonding layer and is instead interfaced with a non-conducting bonding layer.

Patch layer 1231 may also be a PCB that includes metal as radiating patches 1211. In one embodiment, gasket layer 1232 includes spacers 1239 that provide a mechanical standoff to define the dimension between metal layer 1236 and patch 1211. In one embodiment, the spacers are 75 microns, but other sizes may be used (e.g., 3-200 mm). As mentioned above, in one embodiment, the antenna aperture of FIG. 8 includes multiple tunable resonator/slots, such as tunable resonator/slot 1210 includes patch 1211, liquid crystal 1213A, and iris 1212 of FIG. 7. The chamber for liquid crystal 1213A is defined by spacers 1239, iris layer 1233 and metal layer 1236. When the chamber is filled with liquid crystal, patch layer 1231 can be laminated onto spacers 1239 to seal liquid crystal within resonator layer 1230.

A voltage between patch layer 1231 and iris layer 1233 can be modulated to tune the liquid crystal in the gap between the patch and the slots (e.g., tunable resonator/slot 1210). Adjusting the voltage across liquid crystal 1213A varies the capacitance of a slot (e.g., tunable resonator/slot 1210). Accordingly, the reactance of a slot (e.g., tunable resonator/slot 1210) can be varied by changing the capacitance. Resonant frequency of slot 1210 also changes according to the equation $f=1/2\pi\sqrt{LC}$ where f is the resonant frequency of slot 1210 and L and C are the inductance and capacitance of slot 1210, respectively. The resonant frequency of slot 1210 affects the energy radiated from feed wave 1205 propagating through the waveguide. As an example, if feed wave 1205 is 20 GHz, the resonant frequency of a slot 1210 may be adjusted (by varying the capacitance) to 17 GHz so that the slot 1210 couples substantially no energy from feed wave 1205. Or, the resonant frequency of a slot 1210 may be adjusted to 20 GHz so that the slot 1210 couples energy from feed wave 1205 and radiates that energy into free space. Although the examples given are binary (fully radiating or not radiating at all), full gray scale control of the reactance, and therefore the resonant frequency of slot 1210 is possible with voltage variance over a multi-valued range. Hence, the energy radiated from each slot 1210 can be finely controlled so that detailed holographic diffraction patterns can be formed by the array of tunable slots.

In one embodiment, tunable slots in a row are spaced from each other by $\lambda/5$. Other spacings may be used. In one embodiment, each tunable slot in a row is spaced from the closest tunable slot in an adjacent row by $\lambda/2$, and, thus, commonly oriented tunable slots in different rows are spaced by $\lambda/4$, though other spacings are possible (e.g., $\lambda/5$, $\lambda/6.3$). In another embodiment, each tunable slot in a row is spaced from the closest tunable slot in an adjacent row by $\lambda/3$.

Embodiments use reconfigurable metamaterial technology, such as described in U.S. patent application Ser. No. 14/550,178, entitled "Dynamic Polarization and Coupling Control from a Steerable Cylindrically Fed Holographic Antenna", filed Nov. 21, 2014 and U.S. patent application Ser. No. 14/610,502, entitled "Ridged Waveguide Feed Structures for Reconfigurable Antenna", filed Jan. 30, 2015.

FIGS. 9A-D illustrate one embodiment of the different layers for creating the slotted array. The antenna array includes antenna elements that are positioned in rings, such as the example rings shown in FIG. 5. Note that in this example the antenna array has two different types of antenna elements that are used for two different types of frequency bands.

Figure 9A:
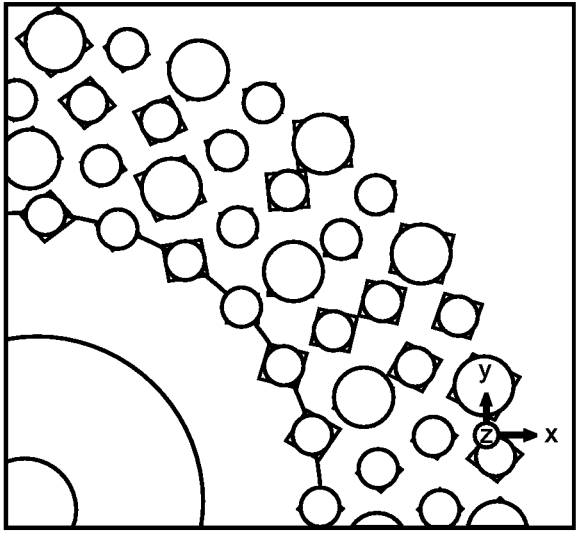
FIG. 9A illustrates a portion of the first iris board layer with locations corresponding to the slots.
Figure 9B:
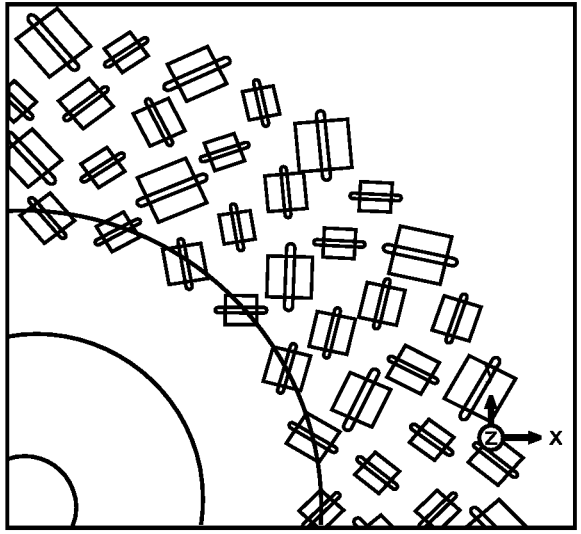
FIG. 9B illustrates a portion of the second iris board layer containing slots.
Figure 9C:
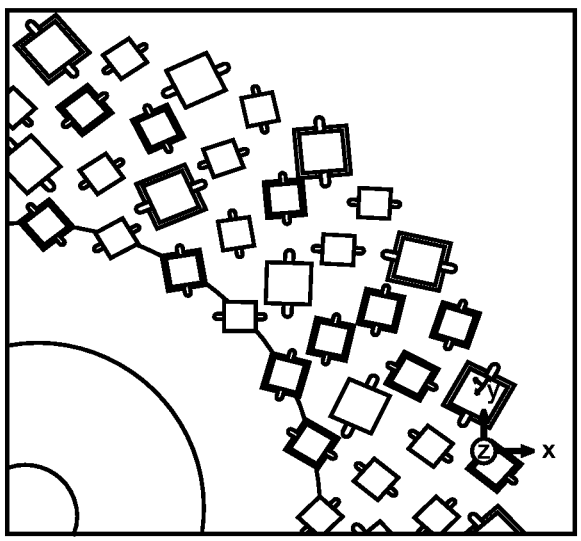
FIG. 9C illustrates patches over a portion of the second iris board layer.
Figure 9D:
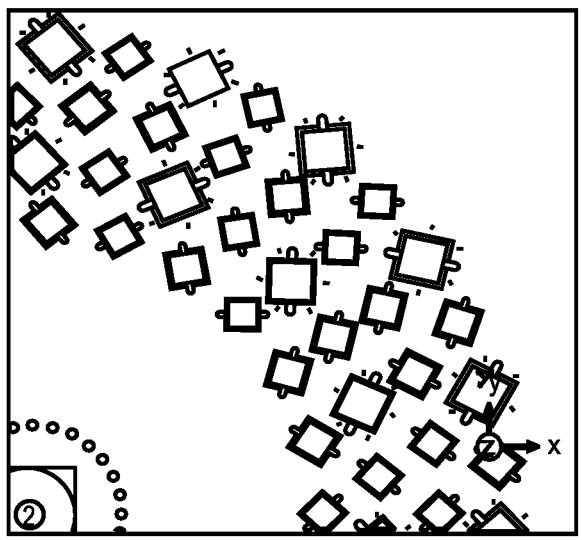
FIG. 9D illustrates a top view of a portion of the slotted array.

FIG. 9A illustrates a portion of the first iris board layer with locations corresponding to the slots. Referring to FIG. 9A, the circles are open areas/slots in the metallization in the bottom side of the iris substrate, and are for controlling the coupling of elements to the feed (the feed wave). Note that this layer is an optional layer and is not used in all designs. FIG. 9B illustrates a portion of the second iris board layer containing slots. FIG. 9C illustrates patches over a portion of the second iris board layer. FIG. 9D illustrates a top view of a portion of the slotted array.

Figure 10:
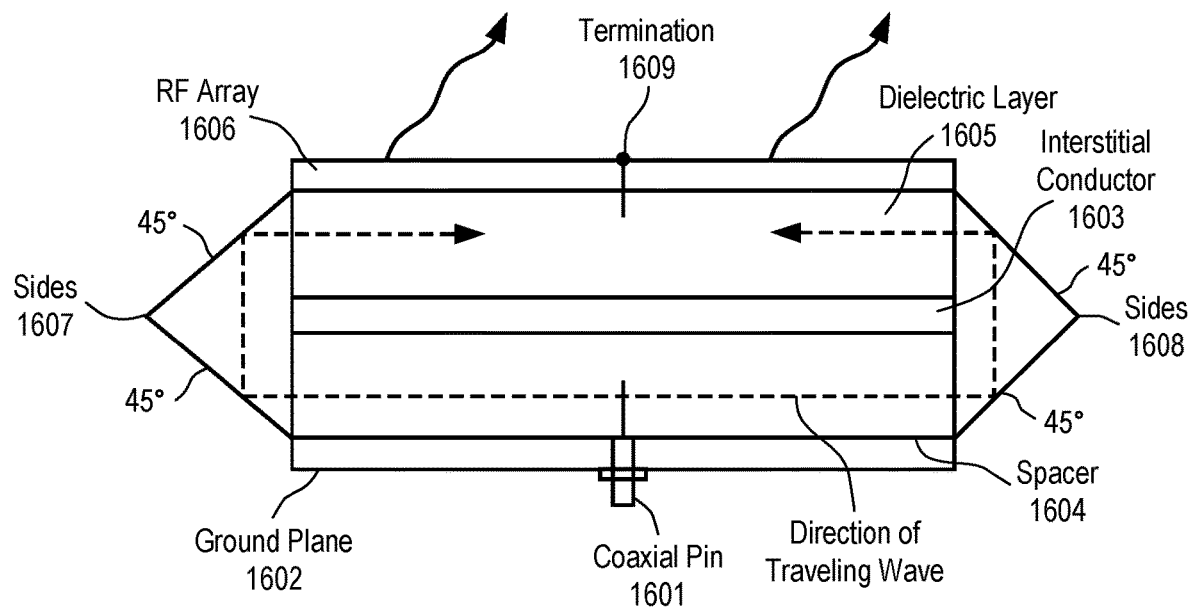
FIG. 10 illustrates a side view of one embodiment of a cylindrically fed antenna structure.

FIG. 10 illustrates a side view of one embodiment of a cylindrically fed antenna structure. The antenna produces an inwardly travelling wave using a double layer feed structure (i.e., two layers of a feed structure). In one embodiment, the antenna includes a circular outer shape, though this is not required. That is, non-circular inward travelling structures can be used. In one embodiment, the antenna structure in FIG. 10 includes a coaxial feed, such as, for example, described in U.S. Publication No. 2015/0236412, entitled "Dynamic Polarization and Coupling Control from a Steerable Cylindrically Fed Holographic Antenna", filed on Nov. 21, 2014.

Referring to FIG. 10, a coaxial pin 1601 is used to excite the field on the lower level of the antenna. In one embodiment, coaxial pin 1601 is a 50Ω coax pin that is readily available. Coaxial pin 1601 is coupled (e.g., bolted) to the bottom of the antenna structure, which is conducting ground plane 1602.

Separate from conducting ground plane 1602 is interstitial conductor 1603, which is an internal conductor. In one embodiment, conducting ground plane 1602 and interstitial conductor 1603 are parallel to each other. In one embodiment, the distance between ground plane 1602 and interstitial conductor 1603 is 0.1-0.15". In another embodiment, this distance may be $\lambda/2$, where $\lambda$ is the wavelength of the travelling wave at the frequency of operation.

Ground plane 1602 is separated from interstitial conductor 1603 via a spacer 1604. In one embodiment, spacer 1604 is a foam or air-like spacer. In one embodiment, spacer 1604 comprises a plastic spacer.

On top of interstitial conductor 1603 is dielectric layer 1605. In one embodiment, dielectric layer 1605 is plastic. The purpose of dielectric layer 1605 is to slow the travelling wave relative to free space velocity. In one embodiment, dielectric layer 1605 slows the travelling wave by 30% relative to free space. In one embodiment, the range of indices of refraction that are suitable for beam forming are 1.2-1.8, where free space has by definition an index of refraction equal to 1. Other dielectric spacer materials, such as, for example, plastic, may be used to achieve this effect. Note that materials other than plastic may be used as long as they achieve the desired wave slowing effect. Alternatively, a material with distributed structures may be used as dielectric 1605, such as periodic sub-wavelength metallic structures that can be machined or lithographically defined, for example.

An RF-array 1606 is on top of dielectric 1605. In one embodiment, the distance between interstitial conductor 1603 and RF-array 1606 is 0.1-0.15". In another embodiment, this distance may be $\lambda_{eff}/2$, where $\lambda_{eff}$ is the effective wavelength in the medium at the design frequency.

The antenna includes sides 1607 and 1608. Sides 1607 and 1608 are angled to cause a travelling wave feed from coax pin 1601 to be propagated from the area below interstitial conductor 1603 (the spacer layer) to the area above interstitial conductor 1603 (the dielectric layer) via reflection. In one embodiment, the angle of sides 1607 and 1608 are at 45° angles. In an alternative embodiment, sides 1607 and 1608 could be replaced with a continuous radius to achieve the reflection. While FIG. 10 shows angled sides that have angle of 45 degrees, other angles that accomplish signal transmission from lower level feed to upper level feed may be used. That is, given that the effective wavelength in the lower feed will generally be different than in the upper feed, some deviation from the ideal 45° angles could be used to aid transmission from the lower to the upper feed level. For example, in another embodiment, the 45° angles are replaced with a single step. The steps on one end of the antenna go around the dielectric layer, interstitial the conductor, and the spacer layer. The same two steps are at the other ends of these layers.

In operation, when a feed wave is fed in from coaxial pin 1601, the wave travels outward concentrically oriented from coaxial pin 1601 in the area between ground plane 1602 and interstitial conductor 1603. The concentrically outgoing waves are reflected by sides 1607 and 1608 and travel inwardly in the area between interstitial conductor 1603 and RF array 1606. The reflection from the edge of the circular perimeter causes the wave to remain in phase (i.e., it is an in-phase reflection). The travelling wave is slowed by dielectric layer 1605. At this point, the travelling wave starts interacting and exciting with elements in RF array 1606 to obtain the desired scattering.

To terminate the travelling wave, a termination 1609 is included in the antenna at the geometric center of the antenna. In one embodiment, termination 1609 comprises a pin termination (e.g., a 50Ω pin). In another embodiment, termination 1609 comprises an RF absorber that terminates unused energy to prevent reflections of that unused energy back through the feed structure of the antenna. These could be used at the top of RF array 1606.

Figure 11:
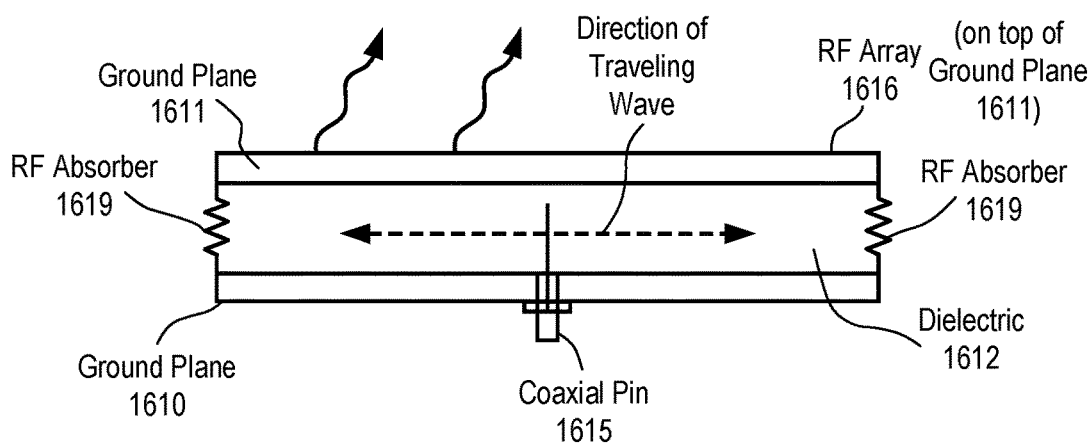
FIG. 11 illustrates another embodiment of the antenna system with an outgoing wave.

FIG. 11 illustrates another embodiment of the antenna system with an outgoing wave. Referring to FIG. 11, two ground planes 1610 and 1611 are substantially parallel to each other with a dielectric layer 1612 (e.g., a plastic layer, etc.) in between ground planes. RF absorbers 1619 (e.g., resistors) couple the two ground planes 1610 and 1611 together. A coaxial pin 1615 (e.g., 50Ω) feeds the antenna. An RF array 1616 is on top of dielectric layer 1612 and ground plane 1611.

In operation, a feed wave is fed through coaxial pin 1615 and travels concentrically outward and interacts with the elements of RF array 1616.

The cylindrical feed in both the antennas of FIGS. 10 and 11 improves the service angle of the antenna. Instead of a service angle of plus or minus forty-five degrees azimuth (±45° Az) and plus or minus twenty-five degrees elevation (±25° El), in one embodiment, the antenna system has a service angle of seventy-five degrees (75°) from the bore sight in all directions. As with any beam forming antenna comprised of many individual radiators, the overall antenna gain is dependent on the gain of the constituent elements, which themselves are angle-dependent. When using common radiating elements, the overall antenna gain typically decreases as the beam is pointed further off bore sight. At 75 degrees off bore sight, significant gain degradation of about 6 dB is expected.

Embodiments of the antenna having a cylindrical feed solve one or more problems. These include dramatically simplifying the feed structure compared to antennas fed with a corporate divider network and therefore reducing total required antenna and antenna feed volume; decreasing sensitivity to manufacturing and control errors by maintaining high beam performance with coarser controls (extending all the way to simple binary control); giving a more advantageous side lobe pattern compared to rectilinear feeds because the cylindrically oriented feed waves result in spatially diverse side lobes in the far field; and allowing polarization to be dynamic, including allowing left-hand circular, right-hand circular, and linear polarizations, while not requiring a polarizer.

Array of Wave Scattering Elements

RF array 1606 of FIG. 10 and RF array 1616 of FIG. 11 include a wave scattering subsystem that includes a group of patch antennas (i.e., scatterers) that act as radiators. This group of patch antennas comprises an array of scattering metamaterial elements.

In one embodiment, each scattering element in the antenna system is part of a unit cell that consists of a lower conductor, a dielectric substrate and an upper conductor that embeds a complementary electric inductive-capacitive resonator ("complementary electric LC" or "CELC") that is etched in or deposited onto the upper conductor.

In one embodiment, a liquid crystal (LC) is injected in the gap around the scattering element. Liquid crystal is encapsulated in each unit cell and separates the lower conductor associated with a slot from an upper conductor associated with its patch. Liquid crystal has a permittivity that is a function of the orientation of the molecules comprising the liquid crystal, and the orientation of the molecules (and thus the permittivity) can be controlled by adjusting the bias voltage across the liquid crystal. Using this property, the liquid crystal acts as an on/off switch for the transmission of energy from the guided wave to the CELC. When switched on, the CELC emits an electromagnetic wave like an electrically small dipole antenna.

Controlling the thickness of the LC increases the beam switching speed. A fifty percent (50%) reduction in the gap between the lower and the upper conductor (the thickness of the liquid crystal) results in a fourfold increase in speed. In another embodiment, the thickness of the liquid crystal results in a beam switching speed of approximately fourteen milliseconds (14 ms). In one embodiment, the LC is doped in a manner well-known in the art to improve responsiveness so that a seven millisecond (7 ms) requirement can be met.

The CELC element is responsive to a magnetic field that is applied parallel to the plane of the CELC element and perpendicular to the CELC gap complement. When a voltage is applied to the liquid crystal in the metamaterial scattering unit cell, the magnetic field component of the guided wave induces a magnetic excitation of the CELC, which, in turn, produces an electromagnetic wave in the same frequency as the guided wave.

The phase of the electromagnetic wave generated by a single CELC can be selected by the position of the CELC on the vector of the guided wave. Each cell generates a wave in phase with the guided wave parallel to the CELC. Because the CELCs are smaller than the wave length, the output wave has the same phase as the phase of the guided wave as it passes beneath the CELC.

In one embodiment, the cylindrical feed geometry of this antenna system allows the CELC elements to be positioned at forty-five degree (45°) angles to the vector of the wave in the wave feed. This position of the elements enables control of the polarization of the free space wave generated from or received by the elements. In one embodiment, the CELCs are arranged with an inter-element spacing that is less than a free-space wavelength of the operating frequency of the antenna. For example, if there are four scattering elements per wavelength, the elements in the 30 GHz transmit antenna will be approximately 2.5 mm (i.e., ¼th the 10 mm free-space wavelength of 30 GHz).

In one embodiment, the CELCs are implemented with patch antennas that include a patch co-located over a slot with liquid crystal between the two. In this respect, the metamaterial antenna acts like a slotted (scattering) wave guide. With a slotted wave guide, the phase of the output wave depends on the location of the slot in relation to the guided wave.

An Example System Embodiment

In one embodiment, the combined antenna apertures are used in a television system that operates in conjunction with a set top box. For example, in the case of a dual reception antenna, satellite signals received by the antenna are provided to a set top box (e.g., a DirecTV receiver) of a television system. More specifically, the combined antenna operation is able to simultaneously receive RF signals at two different frequencies and/or polarizations. That is, one sub-array of elements is controlled to receive RF signals at one frequency and/or polarization, while another sub-array is controlled to receive signals at another, different frequency and/or polarization. These differences in frequency or polarization represent different channels being received by the television system. Similarly, the two antenna arrays can be controlled for two different beam positions to receive channels from two different locations (e.g., two different satellites) to simultaneously receive multiple channels.

Figure 12:
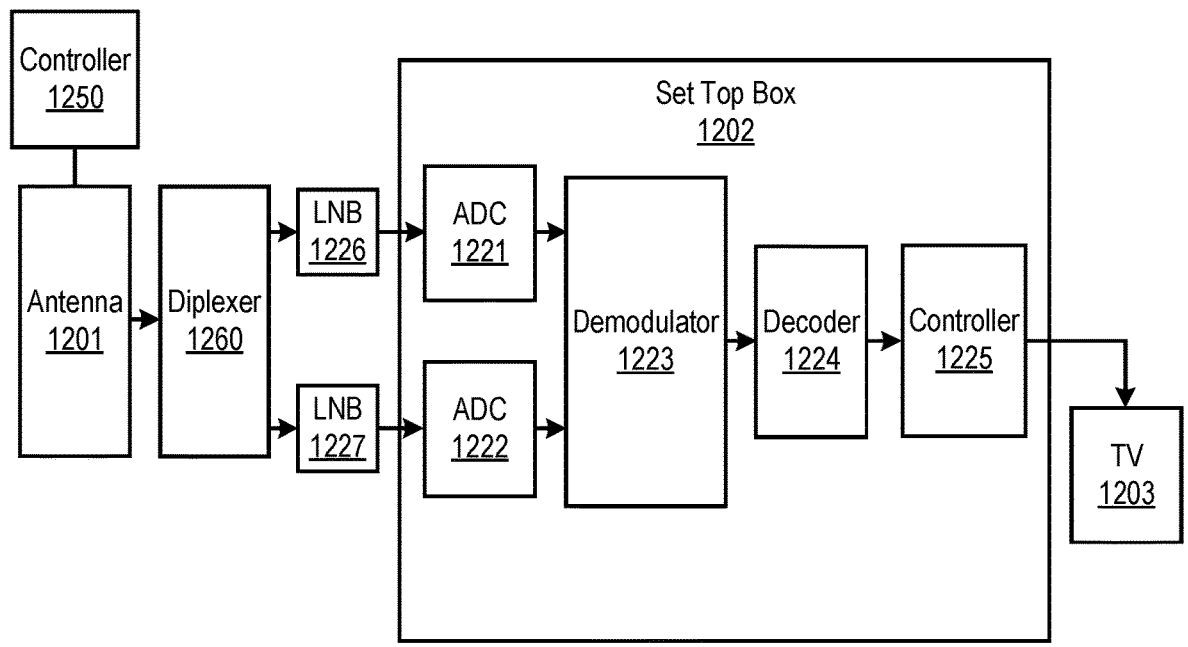
FIG. 12 is a block diagram of one embodiment of a communication system that performs dual reception simultaneously in a television system.

FIG. 12 is a block diagram of one embodiment of a communication system that performs dual reception simultaneously in a television system. Referring to FIG. 12, antenna 1201 includes two spatially interleaved antenna apertures operable independently to perform dual reception simultaneously at different frequencies and/or polarizations as described above. Note that while only two spatially interleaved antenna operations are mentioned, the TV system may have more than two antenna apertures (e.g., 3, 4, 5, etc. antenna apertures).

In one embodiment, antenna 1201, including its two interleaved slotted arrays, is coupled to diplexer 1260. The coupling may include one or more feeding networks that receive the signals from elements of the two slotted arrays to produce two signals that are fed into diplexer 1260. In one embodiment, diplexer 1260 is a commercially available diplexer (e.g., model PB1081WA Ku-band sitcom diplexer from A1 Microwave).

Diplexer 1260 is coupled to a pair of low noise block down converters (LNBs) 1226 and 1227, which perform a noise filtering function, a down conversion function, and amplification in a manner well-known in the art. In one embodiment, LNBs 1226 and 1227 are in an out-door unit (ODU). In another embodiment, LNBs 1226 and 1227 are integrated into the antenna apparatus. LNBs 1226 and 1227 are coupled to a set top box 1202, which is coupled to television 1203.

Set top box 1202 includes a pair of analog-to-digital converters (ADCs) 1221 and 1222, which are coupled to LNBs 1226 and 1227, to convert the two signals output from diplexer 1230 into digital format.

Once converted to digital format, the signals are demodulated by demodulator 1223 and decoded by decoder 1224 to obtain the encoded data on the received waves. The decoded data is then sent to controller 1225, which sends it to television 1203.

Controller 1250 controls antenna 1201, including the interleaved slotted array elements of both antenna apertures on the single combined physical aperture.

An Example of a Full Duplex Communication System

Figure 13:
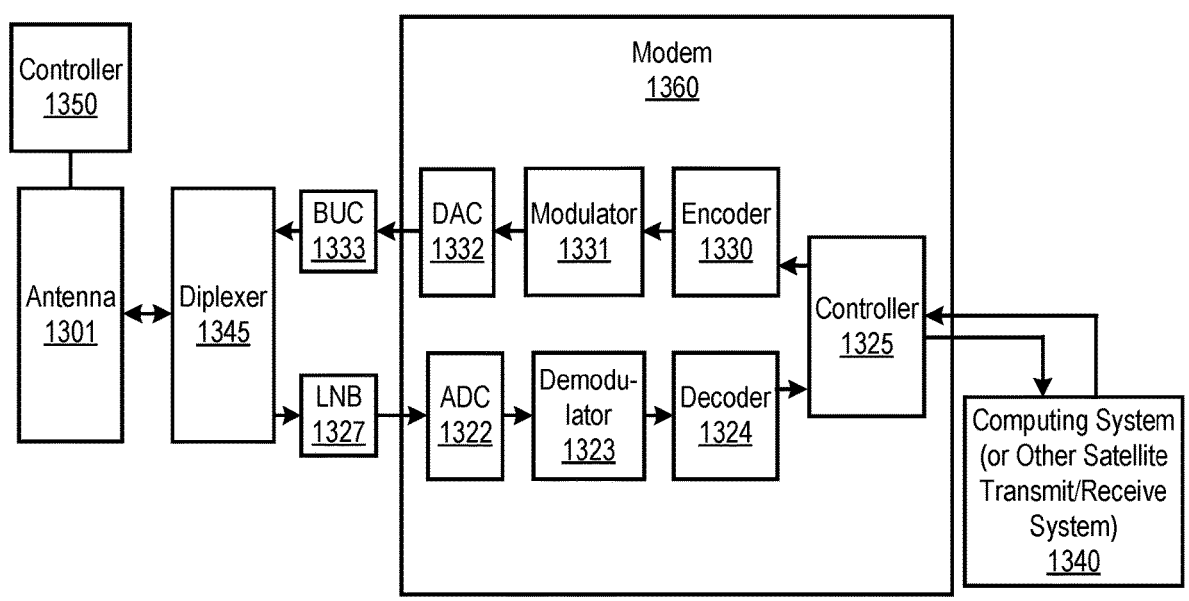
FIG. 13 is a block diagram of another embodiment of a communication system having simultaneous transmit and receive paths.

In another embodiment, the combined antenna apertures are used in a full duplex communication system. FIG. 13 is a block diagram of another embodiment of a communication system having simultaneous transmit and receive paths. While only one transmit path and one receive path are shown, the communication system may include more than one transmit path and/or more than one receive path.

Referring to FIG. 13, antenna 1301 includes two spatially interleaved antenna arrays operable independently to transmit and receive simultaneously at different frequencies as described above. In one embodiment, antenna 1301 is coupled to diplexer 1345. The coupling may be by one or more feeding networks. In one embodiment, in the case of a radial feed antenna, diplexer 1345 combines the two signals and the connection between antenna 1301 and diplexer 1345 is a single broad-band feeding network that can carry both frequencies.

Diplexer 1345 is coupled to a low noise block down converter (LNBs) 1327, which performs a noise filtering function and a down conversion and amplification function in a manner well-known in the art. In one embodiment, LNB 1327 is in an out-door unit (ODU). In another embodiment, LNB 1327 is integrated into the antenna apparatus. LNB 1327 is coupled to a modem 1360, which is coupled to computing system 1340 (e.g., a computer system, modem, etc.).

Modem 1360 includes an analog-to-digital converter (ADC) 1322, which is coupled to LNB 1327, to convert the received signal output from diplexer 1345 into digital format. Once converted to digital format, the signal is demodulated by demodulator 1323 and decoded by decoder 1324 to obtain the encoded data on the received wave. The decoded data is then sent to controller 1325, which sends it to computing system 1340.

Modem 1360 also includes an encoder 1330 that encodes data to be transmitted from computing system 1340. The encoded data is modulated by modulator 1331 and then converted to analog by digital-to-analog converter (DAC) 1332. The analog signal is then filtered by a BUC (up-convert and high pass amplifier) 1333 and provided to one port of diplexer 1345. In one embodiment, BUC 1333 is in an out-door unit (ODU).

Diplexer 1345 operating in a manner well-known in the art provides the transmit signal to antenna 1301 for transmission.

Controller 1350 controls antenna 1301, including the two arrays of antenna elements on the single combined physical aperture.

The communication system would be modified to include the combiner/arbiter described above. In such a case, the combiner/arbiter after the modem but before the BUC and LNB.

Note that the full duplex communication system shown in FIG. 13 has a number of applications, including but not limited to, internet communication, vehicle communication (including software updating), etc.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:
1. An antenna comprising:
a physical antenna aperture having a first substrate and a second substrate forming an array of radio-frequency (RF) radiating antenna elements that are controlled and operable together to form a beam for a frequency band for use in holographic beam steering, wherein each of the antenna elements is coupled to a circuit to supply a voltage to the said each antenna element and a storage capacitor formed with a plurality of conductive layers on the first substrate, wherein top and bottom conductive layers of the plurality of conductive layers are at a first voltage that is equal a second voltage on a conductive layer of the second substrate to reduce parasitic capacitance produced between the storage capacitor and the conductive layer on the second substrate in comparison to the storage capacitor being without the top conductive layer.

2. The antenna defined in claim 1 further comprising liquid crystal between the first and second substrates, and wherein the first and second substrates comprise a patch substrate and an iris substrate.

3. The antenna defined in claim 2 wherein the patch and iris substrates are glass substrates.

4. The antenna defined in claim 1 wherein the circuit comprises a transistor having a gate of the transistor formed from a first portion of a gate metal layer on the first substrate, the storage capacitor having a bottom plate formed from a second portion of the gate metal layer.

5. The antenna defined in claim 4 wherein the transistor comprises a thin film transistor (TFT).

6. The antenna defined in claim 4 wherein the storage capacitor structure comprises:
a first metal layer,
a first dielectric layer on top of the first metal layer,
a second metal layer on top of the first dielectric layer,
a second dielectric layer on top of the second metal layer, and
a third metal layer on top of the second dielectric layer, with the third metal layer being electrically coupled to the first metal layer.

7. The antenna defined in claim 6 wherein the third metal layer is electrically coupled to the first metal layer using a via.

8. The antenna defined in claim 7 wherein
the first metal layer is formed from part of a metal layer fabricated to form part of the gate of the transistor formed on the first substrate, and
the second metal layer is formed from part of a metal layer fabricated to form source and drain electrodes of the transistor formed on the first substrate.

9. The antenna defined in claim 1 wherein the array of antenna elements comprises a tunable slotted array of RF radiating antenna elements.

10. The antenna defined in claim 1 wherein the array of antenna elements comprises two or more antenna sub-arrays.

11. The antenna defined in claim 10 wherein most elements in each of the at least two antenna sub-arrays are interleaved with respect to each other.

12. The antenna defined in claim 10 wherein each of the at least two antenna sub-arrays comprise a slotted array and each slotted array comprises a plurality of slots and further wherein each slot is tuned to provide a desired scattering at a given frequency.

13. The antenna defined in claim 12 wherein each slotted array comprises:
a plurality of slots;
a plurality of patches, wherein each of the patches is co-located over and separated from a slot in the plurality of slots, forming a patch/slot pair, each patch/slot pair being turned off or on based on application of a voltage to the patch in the pair; and
a controller to apply a control pattern to control the patch/slot pairs to cause generation of a beam.

14. An antenna comprising:
a physical antenna aperture having a first substrate and a second substrate forming an array of radio-frequency (RF) radiating antenna elements that are controlled and operable together to form a beam for a frequency band for use in holographic beam steering, wherein the second substrate comprises a conductive layer, wherein each of the antenna elements is coupled to a circuit to supply a voltage to the said each antenna element and a storage capacitor formed on a first substrate, wherein the storage capacitor comprises
a first metal layer,
a first dielectric layer on top of the first metal layer,
a second metal layer on top of the first dielectric layer,
a second dielectric layer on top of the second metal layer, and
a third metal layer on top of the second dielectric layer, with the third metal layer being electrically coupled to the first metal layer, wherein the first and third metal layers are at a first voltage that is equal a second voltage on the conductive layer of the second substrate to reduce parasitic capacitance produced between the storage capacitor and the conductive layer on the second substrate in comparison to the storage capacitor being without the third metal layer.

15. The antenna defined in claim 14 wherein the third metal layer is electrically coupled to the first metal layer using a via.

16. The antenna defined in claim 14 wherein
the first metal layer is formed from part of a metal layer fabricated to form part of a gate of a transistor formed on the first substrate, and
the second metal layer is formed from part of a metal layer fabricated to form source and drain electrodes of the transistor formed on the first substrate.

17. The antenna defined in claim 16 wherein the transistor comprises a thin film transistor (TFT).

18. The antenna defined in claim 14 wherein the second substrate includes a fourth metal layer, and the first, third and fourth metal layers are at a first voltage.

19. An antenna comprising:
an iris substrate;
a patch substrate,
an array of radio-frequency (RF) radiating antenna elements formed with the patch and iris substrates, the array of RF radiating antenna elements controllable and operable together to form a beam for a frequency band for use in holographic beam steering, wherein the iris substrate comprises a conductive layer, wherein each of the antenna elements is coupled to a circuit to supply a voltage to the said each antenna element and a storage capacitor on the patch substrate, wherein the storage capacitor comprises
a first metal layer,
a first dielectric layer on top of the first metal layer,
a second metal layer on top of the first dielectric layer,
a second dielectric layer on top of the second metal layer, and a third metal layer on top of the second dielectric layer, with the third metal layer being electrically coupled to the first metal layer, wherein the first and third metal layers are at a first voltage that is equal a second voltage on the conductive layer of the iris substrate to reduce parasitic capacitance produced between the storage capacitor and the conductive layer on the iris substrate in comparison to the storage capacitor being without the third metal layer.

20. The antenna defined in claim 19 wherein the third metal layer is electrically coupled to the first metal layer using a via.

21. The antenna defined in claim 19 wherein
the first metal layer is formed from part of a metal layer fabricated to form part of a gate of a transistor formed on the patch substrate, and
the second metal layer is formed from part of a metal layer fabricated to form source and drain electrodes of the transistor formed on the patch substrate.

22. The antenna defined in claim 21 wherein the transistor comprises a thin film transistor (TFT).

23. The antenna defined in claim 19 wherein the iris substrate includes a fourth metal layer, and the first, third and fourth metal layers are at a first voltage.

* * * * *